Patented Apr. 12, 1938

2,114,233

UNITED STATES PATENT OFFICE 2,114,233

POLYMERIC MATERIALS

Harry Trainor Neher, Bristol, and Charles Samuel Hollander, Holmesburg, Pa., assignors to Röhm & Haas Company, Philadelphia, Pa.

No Drawing. Application July 10, 1933, Serial No. 679,712. In Great Britain May 22, 1933

4 Claims. (Cl. 260—2)

This invention relates to new polymeric materials.

An object of this invention is to prepare films suitable for making laminated glass which show a marked improvement over any films heretofore employed. A further object of this invention is to prepare films by polymerizing together polymerizable derivatives of unsaturated organic compounds, particularly esters of acrylic acid and its higher homologues such as methacrylic acid.

Further objects will appear hereinafter.

The plastic used in laminated glass by one of the first men in the field, Benedictus, was Celluloid. Gelatin, from which substantially all the moisture is removed, has been used as a cement in connection with Celluloid. Celluloid presents many disadvantages. No two batches are exactly alike and constant check-ups must be made to insure uniformity. Although improvements have been made in it, it is still somewhat unsatisfactory. A temperature of 120° F. is the approximate limit up to which Celluloid glass would give good service, and at about 60° F. and below the glass has a tendency toward brittleness.

On the other hand, various substitutes for Celluloid have been proposed. Cellulose acetate will bear up well under temperatures up to the boiling point of water but has the disadvantage of a tendency toward brittleness, more haze, and greater cost. Laminations with regenerated cellulose are also very brittle.

Synthetic resins have been proposed but none have found commercial use. "Bakelite" and toluol-sulfonamide formaldehyde resins have been tried but so far as is now known have not been found practicable. Polymers of various unsaturated organic compounds have been suggested and itaconic acid esters have been tried as a cement.

All of the above have disadvantages, particularly unsuitability to variations in temperature. If they show up well at moderate or high temperatures they usually are detrimentally affected by low temperatures and vice versa. They also have a tendency toward discoloration. While under ordinary service conditions the discoloration in a Celluloid glass is usually not particularly noticeable in a year's time, it is apt to become evident not long after. This invention is designed to eliminate the tendency toward discoloration, and it is particularly true of glass using polymers of esters of acrylic acid and its homologues that discoloration is practically eliminated.

In the manufacture of articles involving the use of synthetic resins, it is usually desirable to employ a resin having a specific set of properties. Often, no one resin shows all the desired properties for the use at hand. However, it might be concluded that by mixing a resin A, which is good in certain of the desired properties with another resin B, which, while inferior in those properties in which A excels, is superior in the properties desired but lacking in resin A, it would be possible to have in the resulting combination, a resin which would possess all the desirable properties lacking in each individual resin. Actually, this does not seem to be the case, as may be seen by the untrained eye. When solutions of two or more tough, transparent polymeric substances are mixed and the solvent then removed by evaporation, the resulting films are not tough and transparent as might be expected. Instead, they show varying degrees of opaqueness, a rough mottled appearance, and generally tear very easily in a characteristic manner.

The explanation for this very general phenomenon is probably that resins, being of high molecular weight, do not dissolve in each other, but exist side by side unblended, and the larger the molecules, the less continuous or uniform or transparent is the mixture. A similar phenomenon may be observed in the field of metallic alloys.

We have made the surprising discovery, however, that if the monomeric substances are first mixed in any proportion whatsoever and then polymerized together by any suitable method, the films produced from such polymeric substances show all the properties of the parent polymers to a degree depending on the proportion in which each is incorporated in the new polymer.

To illustrate our invention more fully, we shall give the following examples, it being definitely understood that in so doing we are not restricting ourselves in any way to the specific proportions, ingredients, temperatures, time, catalysts, solvents, etc., which may be varied within wide limits.

*Example 1A.*—50 parts of vinyl acetate, 50 parts of ethyl α-methyl acrylate, 100 parts of ethyl acetate and .05 part of benzoyl peroxide are mixed and kept under reflux on a water bath at 100° C. for 48 hours. The resulting viscous solution is analyzed for total polymer by evaporating the solvent from a weighed sample. The solution is then diluted with ethyl acetate, so that the final solution contains 20% gum by weight. Films are made from this solution. The films so obtained are perfectly smooth and transparent and have a good tensile strength.

*Example 1B.*—If the vinyl acetate is polymerized beforehand, and also the ethyl α-methyl acrylate, in the way described, and separate 20% solutions prepared in ethyl acetate, and the solutions mixed, the films obtained are rough, cloudy and tear very easily in a characteristic manner, indicating that they are not homogeneous mixtures. In every respect, they are very much inferior to films prepared as described above.

*Example 2.*—50 parts of ethyl alpha methyl acrylate, 50 parts of diethyl itaconate, 100 parts of ethylene dichloride and .05 part of benzoyl peroxide are treated under the same conditions as described in Example 1A. The films made from this solution are similar to 1A in smoothness, transparency and tensile strength and intermediate properties. If, however, the two esters are separately polymerized and mixed, the films obtained from the solution have the same bad characteristics described in 1B.

*Example 3.*—25 parts of ethyl alpha methyl acrylate, 75 parts of methyl acrylate, 100 parts of benzene and .05 part of benzoyl peroxide are treated under the same conditions as described in Example 1A. The films made from this solution are similar to 1A in smoothness, transparency and tensile strength, etc. If, however, the two esters are separately polymerized and mixed, the films obtained from the solution have the same bad characteristics described in 1B.

*Example 4.*—50 parts of methyl vinyl ketone, 50 parts of ethyl alpha methyl acrylate, 150 parts of carbon tetrachloride, and .08 part of benzoyl peroxide are treated under the same conditions as described under 1A. Films from this solution are similar to those from 1A. Films from the mechanical mixture of the individual polymers are similar to 1B.

*Example 5.*—50 parts styrene, 50 parts ethyl alpha methyl acrylate and 0.1 part benzoyl peroxide are kept at 100° C. for 48 hours. Films made from a solution in benzene of the resulting polymer are similar to 1A in clearness, etc. Films from mixtures of the individual polymers are similar to 1B.

*Example 6.*—5 parts cyclopentadiene (monomer), 5 parts indene, 15 volumes of chloroform are mixed. To it is added 0.2 part of tin tetrachloride in 1 volume of chloroform. The solution turns deep red and a vigorous reaction takes place almost immediately, causing a good deal of the solvent to boil off. After a half hour, 10 volumes of chloroform are added and the entire solution poured into 100 volumes of absolute alcohol. The precipitated polymer is filtered from the alcohol and dissolved in 10 to 15 volumes of hot benzene, cooled and again precipitated with alcohol. This is repeated until the polymer gives a colorless solution. Films from such a solution are smooth and transparent, but somewhat brittle. Films made from mixed solutions of the individual polymers are very brittle, opaque and rough.

*Example 7.*—50 parts ethyl cinnamate, 50 parts ethyl alpha methyl acrylate and .05 part benzoyl peroxide are kept at 100° C. for 48 hours. The solution of the resulting polymer in ethylene dichloride gives films similar to 1A except they are somewhat softer. Films from the mixture of the individual polymers are similar to 1B.

*Example 8.*—50 parts indene, 50 parts ethyl alpha methyl acrylate and .08 part benzoyl peroxide are kept at 100° C. for 72 hours. The resulting solid polymer, when dissolved in chloroform, gives films which are clear and transparent, but somewhat brittle. Films made by mixing solutions of polyindene and polyethyl alpha methyl acrylate are opaque and of a spotted appearance.

The films prepared as above can be used in the making of laminated glass by any of the methods employed. One process by which a good glass is produced is as follows:

A piece of sheet drawn glass 12″ x 12″ is framed in a wood frame, the glass is then leveled, and about 140 cc. of a solution of any of the above films is poured on. The frame is then covered with paper or glass until the solution has spread out evenly and all air bubbles have disappeared. Then the solvent is allowed to evaporate by gradually increasing the temperature. When the film is free from solvent, it is sprayed with about 10 cc. of a plasticizer such as dibutyl phthalate; a glass plate of the same dimensions is then superimposed upon the film, and the two sheets are then pressed between absorbent paper at a temperature of about 175° C. and about 70 lbs. pressure for about ten minutes. The laminated glass so produced has a smooth, homogeneous appearance, excellent transparency and good strength. Instead of covering only one of the two glass sheets with the gum solution, both of them may be covered, and after the application of the plasticizer to each they may be pressed together in the same manner.

If the vinyl acetate solution and the ethyl α-methyl acrylate solutions are each polymerized separately in the way described and then the solutions mixed, the laminated glass obtained with this mixed solution in the above described manner is cloudy, not homogeneous, and not perfectly transparent, and shows poor tensile strength on breaking, indicating that the mixture of the solution is not homogeneous. In every respect the glass thus prepared is inferior to that made according to Example 1A.

The laminated glass made in the above ways shows great improvement over that already known to the art. Particularly is this true of the glass employing as intermediate layer a film comprising a polymer of mixed esters of acrylic acid and its homologues. The polymer can be prepared from a mixture of esters of one acid, or of several of the acids. The preferred acids are acrylic and α methacrylic.

It is to be understood that the above examples are merely illustrative and in no way restrict the invention. It is apparent to anyone versed in the art that temperatures, pressures, modes of operation, ingredients, solvents and plasticizers, etc. can be varied over wide limits within the spirit of the invention. In preparing the glass the films are ordinarily made beforehand and affixed in a suitable manner. However, it is sometimes advantageous to partially polymerize the mixed materials beforehand and complete the polymerization in situ. Any polymerizing influences can be used including light, heat, pressure, catalysts, etc. It is apparent that most of the ordinary organic solvents can be used such as benzene, toluene, xylene, chlorobenzene, ethylene dichloride, chloroform, carbon tetrachloride, ethyl acetate, methyl acetate, methyl formate, acetone, ethers. Likewise, suitable plasticizers will suggest themselves to anyone versed in the art. These include: dibutyl phthalate, diethyl phthalate, dibutyl and diethyl tartrate, halowax oil, tricresyl phosphate, butyl carbitol, butyl cellosolve, butyl stearate, diethyl malonate, diethyl succinate, diphenyl carbonate, methyl hexyl carbinol.

The scope of the invention is limited only as indicated in the following claims, it being understood that no portion of the invention is intended to be abandoned or dedicated to the public.

What we claim is:

1. A compound comprising the polymer of a mixture of ethyl alpha methacrylate and methyl acrylate.

2. The product obtained by the joint polymerization of a mixture of $\alpha$-methacrylic acid esters.

3. The product obtained by the joint polymerization of an ester of acrylic acid and the ethyl ester of $\alpha$-methacrylic acid.

4. The product obtained by the joint polymerization of ethyl $\alpha$-methacrylate with another member of the group consisting of esters of acrylic acid and $\alpha$-methacrylic acid.

HARRY T. NEHER.
CHARLES SAMUEL HOLLANDER.